US012652671B2

(12) United States Patent
Liu et al.

(10) Patent No.: US 12,652,671 B2
(45) Date of Patent: Jun. 9, 2026

(54) UE SCHEDULING GRANT BASED ON A PRO-UE IMPLEMENTATION

(71) Applicant: QUALCOMM Incorporated, San Diego, CA (US)

(72) Inventors: Guangyi Liu, San Diego, CA (US); Gabi Sarkis, San Diego, CA (US); Qing Li, Princeton Junction, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 540 days.

(21) Appl. No.: 17/645,371

(22) Filed: Dec. 21, 2021

(65) Prior Publication Data

US 2023/0199780 A1    Jun. 22, 2023

(51) Int. Cl.
| | |
|---|---|
| *H04W 72/23* | (2023.01) |
| *H04W 72/0446* | (2023.01) |
| *H04W 72/0453* | (2023.01) |
| *H04W 72/1263* | (2023.01) |
| *H04W 72/20* | (2023.01) |
| *H04W 72/566* | (2023.01) |

(52) U.S. Cl.
CPC ....... *H04W 72/23* (2023.01); *H04W 72/0446* (2013.01); *H04W 72/0453* (2013.01); *H04W 72/1263* (2013.01); *H04W 72/20* (2023.01); *H04W 72/566* (2023.01)

(58) Field of Classification Search
CPC ......... H04W 72/0446; H04W 72/0453; H04W 72/1263; H04W 72/20; H04W 72/23; H04W 72/25; H04W 72/40; H04W 72/56; H04W 72/566
See application file for complete search history.

(56) References Cited

U.S. PATENT DOCUMENTS

| | | | | |
|---|---|---|---|---|
| 2020/0389900 A1* | 12/2020 | Lee | ......................... | H04W 72/53 |
| 2021/0127404 A1* | 4/2021 | Ryu | ...................... | H04W 80/02 |
| 2021/0212096 A1* | 7/2021 | Hassan Hussein | ... | H04W 72/20 |
| 2022/0232626 A1* | 7/2022 | Li | .......................... | H04W 76/28 |
| 2022/0272727 A1* | 8/2022 | Salim | .................... | H04L 5/0051 |
| 2022/0312435 A1* | 9/2022 | Ye | .......................... | H04L 5/0053 |
| 2023/0050943 A1* | 2/2023 | Luo | ..................... | H04W 72/542 |
| 2023/0078336 A1* | 3/2023 | Lee | ....................... | H04L 1/1887 |
| | | | | 370/329 |
| 2023/0199780 A1* | 6/2023 | Liu | ....................... | H04W 72/23 |
| | | | | 370/329 |

* cited by examiner

*Primary Examiner* — Marcus Smith
*Assistant Examiner* — Zhaohui Yang
(74) *Attorney, Agent, or Firm* — Procopio, Cory, Hargreaves & Savitch LLP

(57) ABSTRACT

This disclosure provides systems, devices, apparatus, and methods, including computer programs encoded on storage media, for a UE scheduling grant based on a pro-UE implementation. A first UE may receive, from one or more UEs, a scheduling request for sidelink resources, and transmit, to the one or more UEs, a sidelink grant using resources for sidelink grant transmissions. The one or more UEs may transmit a sidelink transmission based on the sidelink grant.

20 Claims, 13 Drawing Sheets

1002

Transmit, to a first UE, a scheduling request for a sidelink resource

1004

Receive, from the first UE, a sidelink grant using resources for sidelink grant transmissions

1006

Transmit a sidelink transmission based on the sidelink grant

1000

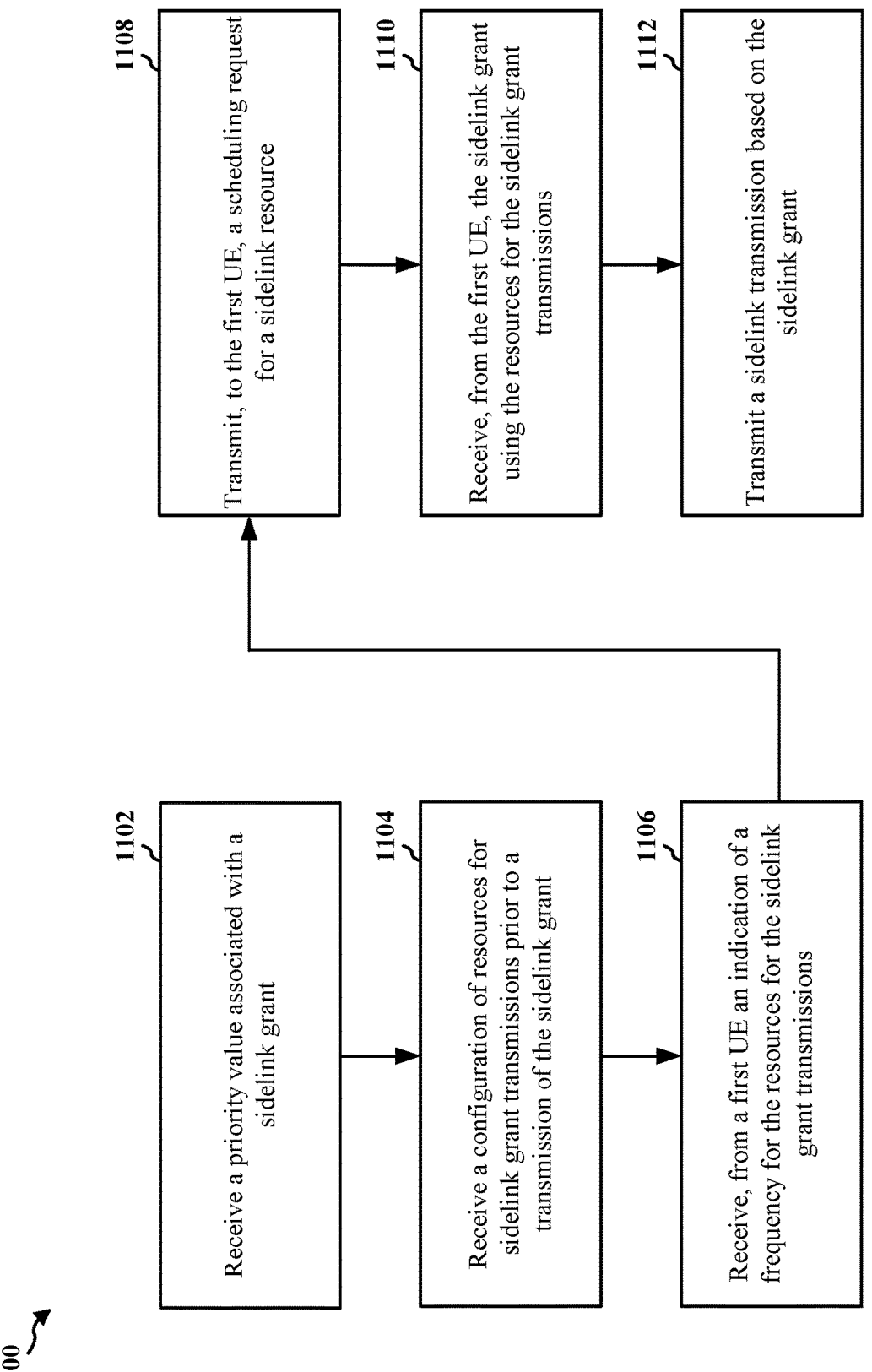

1102 Receive a priority value associated with a sidelink grant

1104 Receive a configuration of resources for sidelink grant transmissions prior to a transmission of the sidelink grant 1106 Receive, from a first UE an indication of a frequency for the resources for the sidelink grant transmissions 1108 Transmit, to the first UE, a scheduling request for a sidelink resource 1110 Receive, from the first UE, the sidelink grant using the resources for the sidelink grant transmissions 1112 Transmit a sidelink transmission based on the sidelink grant

UE SCHEDULING GRANT BASED ON A PRO-UE IMPLEMENTATION

TECHNICAL FIELD

The present disclosure relates generally to communication systems, and more particularly, to wireless communication that includes scheduling of sidelink communication by a user equipment (UE).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may receive, from one or more user equipments (UEs), a scheduling request for sidelink resources; and transmit, from a first UE to the one or more UEs, a sidelink grant using resources for sidelink grant transmissions.

In another aspect of the disclosure, a method, a computer-readable medium, and an apparatus are provided. The apparatus may transmit, to a first UE, a scheduling request for a sidelink resource; receive, from the first UE, a sidelink grant using resources for sidelink grant transmissions; and transmit a sidelink transmission based on the sidelink grant.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 11 is a flowchart of a method of wireless communication at a second UE.

DETAILED DESCRIPTION

Figure 1:
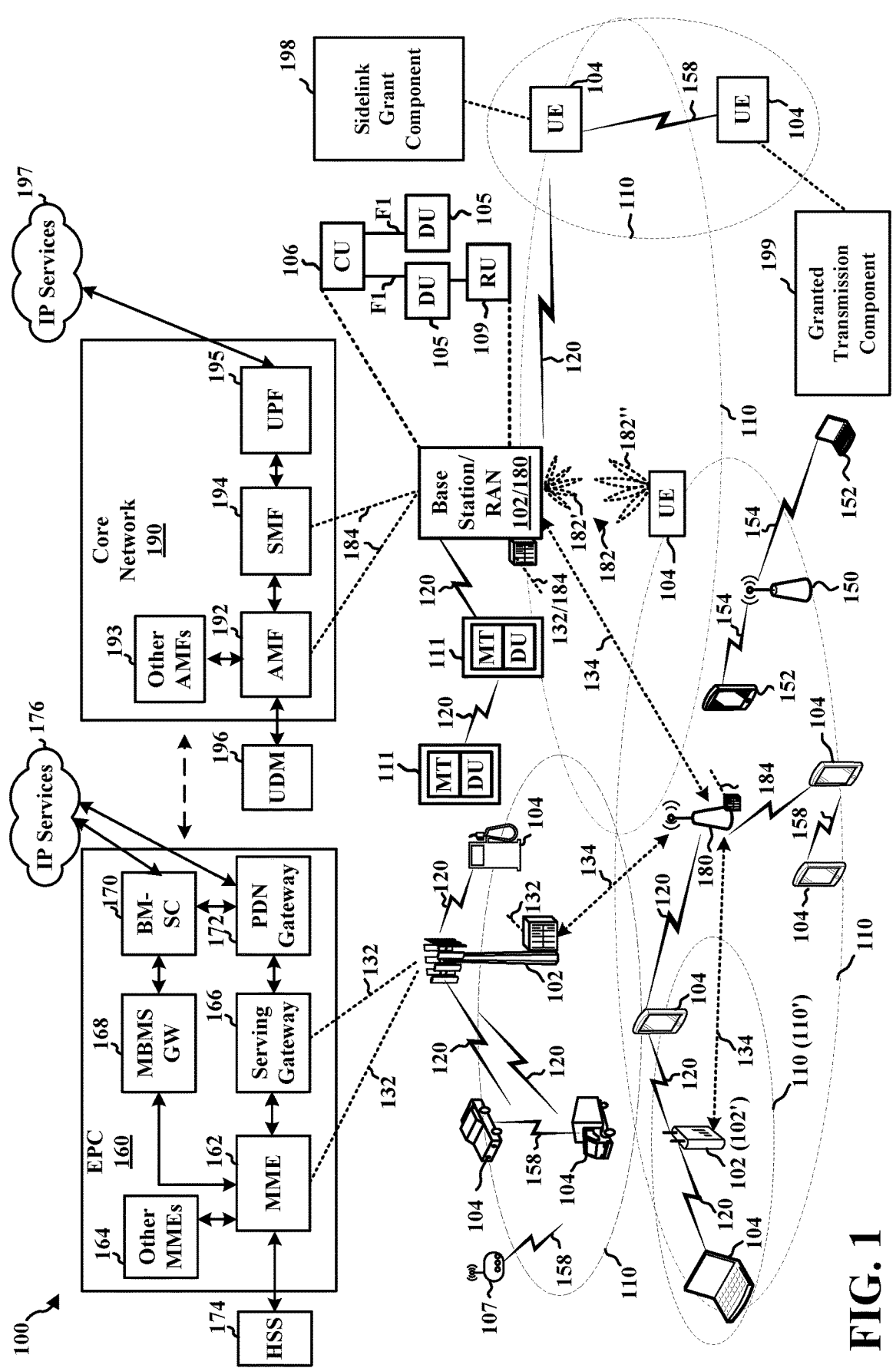
FIG. 1 is a diagram illustrating an example of a wireless communications system and an access network.

Central scheduling techniques in sidelink communication environments may be performed to reduce a number of instances where sidelink user equipment (UEs) in proximity to each other attempt to utilize a same set of time and frequency resources for one or more sidelink communications. For example, the sidelink UEs may designate a particular UE of the sidelink UEs to serve as the central scheduler for scheduling transmissions of the sidelink UEs. The central scheduler may be configured to manage congestion, half-duplex scheduling conflicts, quality of service (QoS), spectrum utilization, channel access, etc., of the sidelink communication environment.

To enable a pro-UE implementation, the central scheduler may transmit a grant message to one or more scheduled UEs, based on one or more sidelink transmissions of the one or more scheduled UEs having a higher priority than the grant message. That is, the one or more sidelink transmissions may have a higher priority than the grant message to ensure that the one or more sidelink transmissions are communicated instead of the grant message in cases of overlapping resources. In the UE scheduling grant, first-stage sidelink control information (SCI-1) may reserve resources for the one or more sidelink transmissions. Either a previously reserved bit in the SCI-1 may indicate that the SCI-1 is associated with the one or more sidelink transmissions or a second-stage sidelink control information (SCI-2) format may be used to indicate that the SCI-1 is associated with the one or more sidelink transmissions. The SCI-2 may be indicative of assigned resources in cases where the grant message includes a grant of resources for a plurality of the sidelink UEs.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP-GAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184 (e.g., Xn interface), and the third backhaul links 134 may be wired or wireless.

In some aspects, a base station 102 or 180 may be referred as a RAN and may include aggregated or disaggregated components. As an example of a disaggregated RAN, a base station may include a central unit (CU) 106, one or more distributed units (DU) 105, and/or one or more remote units (RU) 109, as illustrated in FIG. 1. A RAN may be disaggregated with a split between an RU 109 and an aggregated CU/DU. A RAN may be disaggregated with a split between the CU 106, the DU 105, and the RU 109. A RAN may be disaggregated with a split between the CU 106 and an aggregated DU/RU. The CU 106 and the one or more DUs 105 may be connected via an F1 interface. A DU 105 and an RU 109 may be connected via a fronthaul interface. A connection between the CU 106 and a DU 105 may be referred to as a midhaul, and a connection between a DU 105 and an RU 109 may be referred to as a fronthaul. The connection between the CU 106 and the core network may be referred to as the backhaul. The RAN may be based on a functional split between various components of the RAN, e.g., between the CU 106, the DU 105, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. A CU 106 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

An access network may include one or more integrated access and backhaul (IAB) nodes 111 that exchange wireless communication with a UE 104 or other IAB node 111 to provide access and backhaul to a core network. In an IAB network of multiple IAB nodes, an anchor node may be referred to as an IAB donor. The IAB donor may be a base station 102 or 180 that provides access to a core network 190 or EPC 160 and/or control to one or more IAB nodes 111. The IAB donor may include a CU 106 and a DU 105. IAB nodes 111 may include a DU 105 and a mobile termination (MT). The DU 105 of an IAB node 111 may operate as a parent node, and the MT may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNB s) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a roadside unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as RSU 107, etc. Sidelink communication may be exchanged using a PC5 interface, such as described in connection with the example in FIG. 2. Sidelink communication may be exchanged using a PC5 interface.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB may operate in a traditional sub 6 GHz spectrum, in millimeter wave frequencies, and/or near millimeter wave frequencies in communication with the UE 104. When the gNB operates in millimeter wave or near millimeter wave frequencies, the gNB may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 (e.g., a first UE) may include a sidelink grant component 198 configured to receive, from one or more UEs, a scheduling request for sidelink resources; and transmit, from a first UE to the one or more UEs, a sidelink grant using resources for sidelink grant transmissions. In certain aspects, the UE 104 (e.g., a second UE) may include a granted transmission component 199 configured to transmit, to a first UE, a scheduling request for a sidelink resource; receive, from the first UE, a sidelink grant using resources for sidelink grant transmissions; and transmit a sidelink transmission based on the sidelink grant. Although the following description may be focused on 5G NR, the concepts described herein may be applicable to other similar areas, such as LTE, LTE-A, CDMA, GSM, and other wireless technologies.

Figure 2:
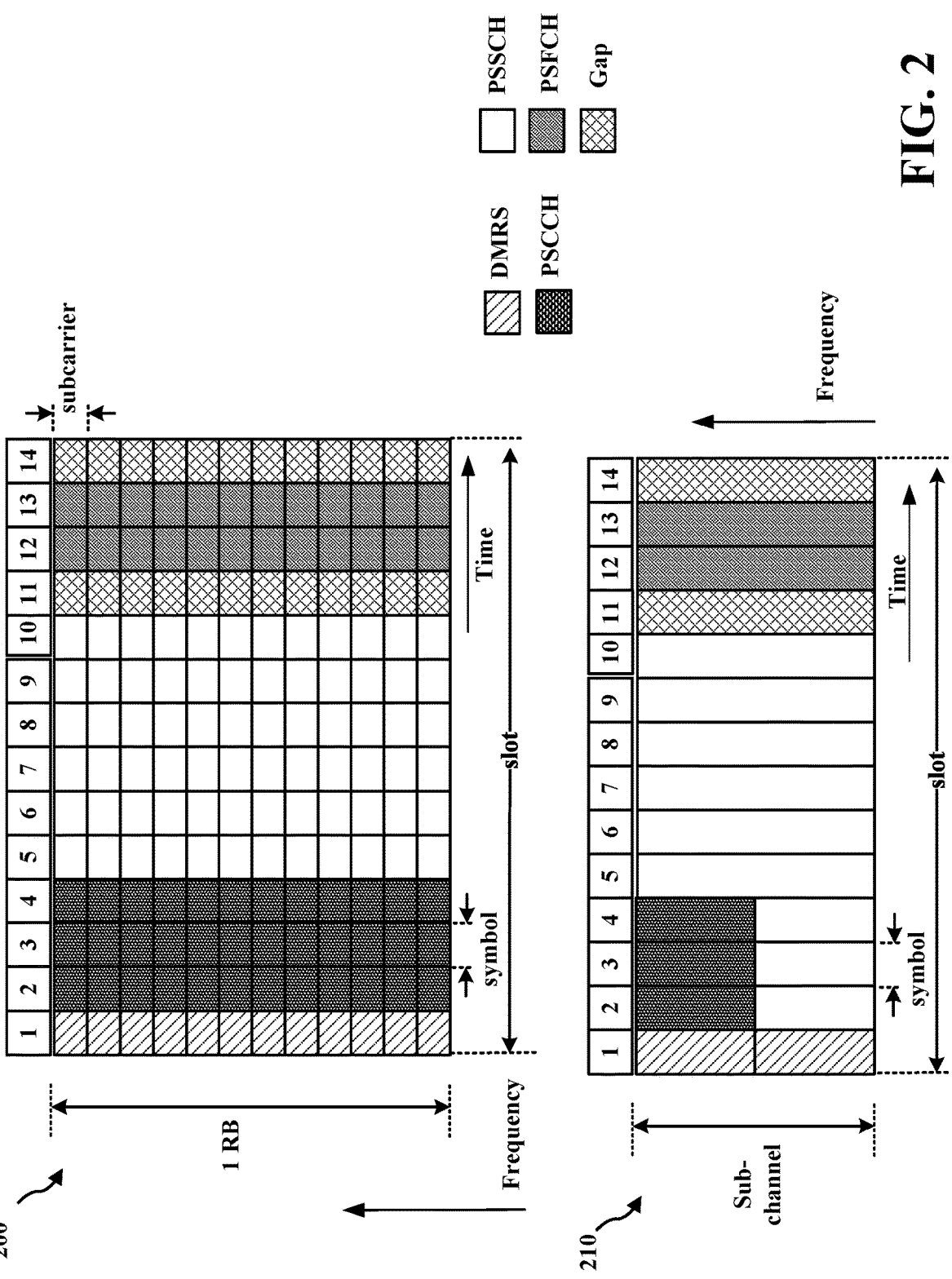
FIG. 2 illustrates example aspects of a sidelink slot structure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include control information in PSCCH and some REs may include demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some aspects.

Figure 3:
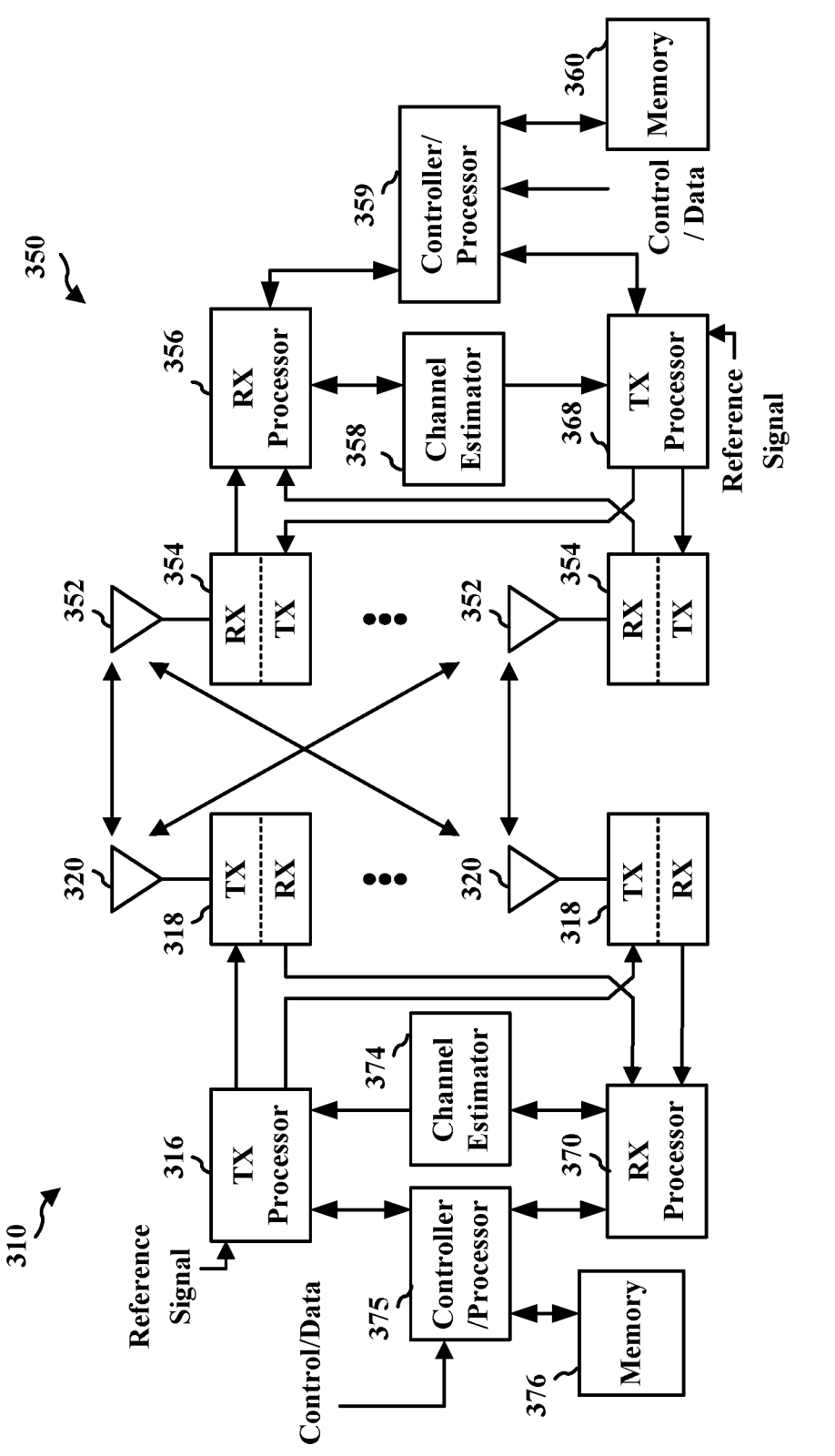
FIG. 3 is a diagram illustrating an example of a first device and a second device involved in wireless communication based, e.g., on sidelink.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARM), priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160.

The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the sidelink grant component 198 of FIG. 1.

At least one of the TX processor 316, the RX processor 370, and the controller/processor 375 may be configured to perform aspects in connection with the granted transmission component 199 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and ultra-reliable low latency communication (URLLC) may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

A UE may transmit a sidelink transmission, e.g., comprising a control channel (e.g., PSCCH) and/or a corresponding data channel (e.g., PSSCH), that may be received directly by one or more surrounding UEs. A control channel may include information (e.g., sidelink control information (SCI)) for decoding the data channel including reservation information, such as information about time and/or frequency resources that are reserved for the data channel transmission. For example, the SCI may indicate a number of TTIs, as well as the RBs that will be occupied by the data transmission. The SCI may also be used by receiving devices to avoid interference by refraining from transmitting on the reserved resources.

Sidelink communication may be based on different types or modes of resource allocation mechanisms. In a first resource allocation mode (which may be referred to herein as "Mode 1"), centralized resource allocation may be provided by a network entity. For example, a base station 102 or 180 may determine resources for sidelink communication and may allocate resources to different UEs 104 to use for sidelink transmissions. In this first mode, a UE receives the allocation of sidelink resources from the base station 102 or 180. In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. Devices communicating based on sidelink, may determine one or more radio resources in the time and frequency domain that are used by other devices in order to select transmission resources that avoid collisions with other devices. The sidelink transmission and/or the resource reservation may be periodic or aperiodic, where a UE may reserve resources for transmission in a current slot and up to two future slots (discussed below).

Thus, in the second mode (e.g., Mode 2), individual UEs may autonomously select resources for sidelink transmission, e.g., without a central entity such as a base station indicating the resources for the device. A first UE may reserve the selected resources in order to inform other UEs about the resources that the first UE intends to use for sidelink transmission(s).

In some examples, the resource selection for sidelink communication may be based on a sensing-based mechanism. For instance, before selecting a resource for a data transmission, a UE may first determine whether resources have been reserved by other UEs.

For example, as part of a sensing mechanism for resource allocation mode 2, the UE may determine (e.g., sense) whether the selected sidelink resource has been reserved by other UE(s) before selecting a sidelink resource for a data transmission. If the UE determines that the sidelink resource has not been reserved by other UEs, the UE may use the selected sidelink resource for transmitting the data, e.g., in a PSSCH transmission. The UE may estimate or determine which radio resources (e.g., sidelink resources) may be in-use and/or reserved by others by detecting and decoding sidelink control information (SCI) transmitted by other UEs. The UE may use a sensing-based resource selection algorithm to estimate or determine which radio resources are in-use and/or reserved by others. The UE may receive SCI from another UE that includes reservation information based on a resource reservation field comprised in the SCI. The UE may continuously monitor for (e.g., sense) and decode SCI from peer UEs. The SCI may include reservation information, e.g., indicating slots and RBs that a particular UE has selected for a future transmission. The UE may exclude resources that are used and/or reserved by other UEs from a set of candidate resources for sidelink transmission by the UE, and the UE may select/reserve resources for a sidelink transmission from the resources that are unused and therefore form the set of candidate resources. The UE may continuously perform sensing for SCI with resource reservations in order to maintain a set of candidate resources from which the UE may select one or more resources for a sidelink transmission. Once the UE selects a candidate resource, the UE may transmit SCI indicating its own reservation of the resource for a sidelink transmission. The number of resources (e.g., sub-channels per subframe) reserved by the UE may depend on the size of data to be transmitted by the UE. Although the example is described for a UE receiving reservations from another UE, the reservations may also be received from an RSU or other device communicating based on sidelink.

Figure 13:
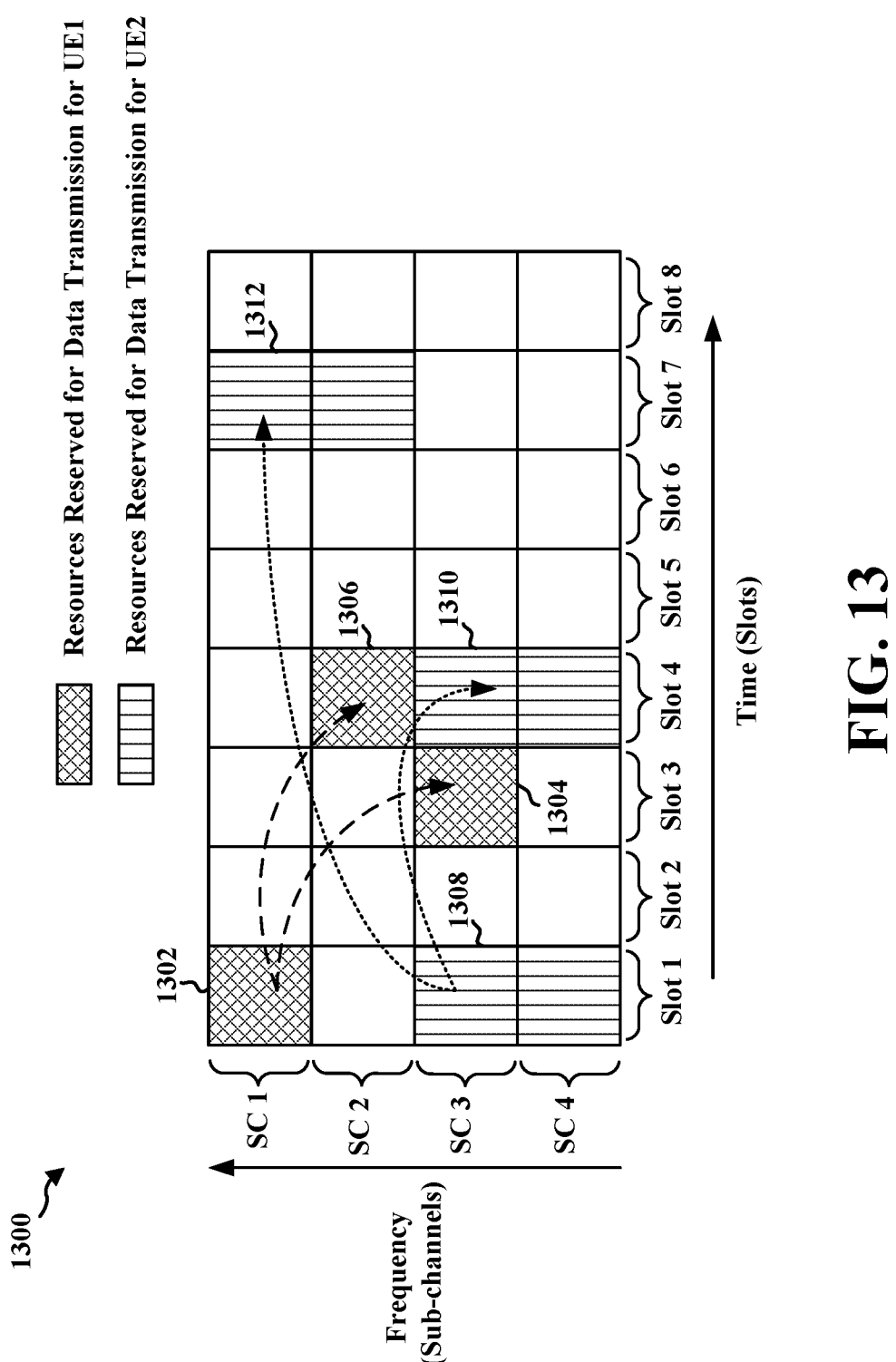
FIG. 13 illustrates example aspects of resource reservation for sidelink communication.

FIG. 13 is an example 1300 of time and frequency resources showing reservations for sidelink transmissions. The resources may be comprised in a sidelink resource pool, for example. The resource allocation for each UE may be in units of one or more sub-channels in the frequency domain (e.g., sub-channels SC1 to SC 4), and may be based on one slot in the time domain. The UE may also use resources in the current slot to perform an initial transmission, and may reserve resources in future slots for retransmissions. In this example, two different future slots are being reserved by UE1 and UE2 for retransmissions. The resource reservation may be limited to a window of a pre-defined slots and sub-channels, such as an 8 time slots by 4 sub-channels window as shown in example 1300, which provides 32 available resource blocks in total. This window may also be referred to as a resource selection window.

A first UE ("UE1) may reserve a sub-channel (e.g., SC 1) in a current slot (e.g., slot 1) for its initial data transmission 1302, and may reserve additional future slots within the window for data retransmissions (e.g., 1304 and 1306). For example, UE1 may reserve sub-channels SC 3 at slots 3 and SC 2 at slot 4 for future retransmissions. UE1 then transmits information regarding which resources are being used and/or reserved by it to other UE(s). UE1 may do by including the reservation information in the reservation resource field of the SCI, e.g., a first stage SCI.

FIG. 13 illustrates that a second UE ("UE2") reserves resources in sub-channels SC 3 and SC 4 at time slot 1 for its current data transmission 1308, and reserve first data retransmission 1310 at time slot 4 using sub-channels SC 3 and SC 4, and reserve second data retransmission 1312 at time slot 7 using sub-channels SC 1 and SC 2 as shown by FIG. 13. Similarly, UE2 may transmit the resource usage and reservation information to other UE(s), such as using the reservation resource field in SCI.

A third UE may consider resources reserved by other UEs within the resource selection window to select resources to transmit its data. The third UE may first decode SCIs within a time period to identify which resources are available (e.g., candidate resources). For example, the third UE may exclude the resources reserved by UE1 and UE2 and may select other available sub-channels and time slots from the candidate resources for its transmission and retransmissions, which may be based on a number of adjacent sub-channels in which the data (e.g., packet) to be transmitted can fit.

While FIG. 13 illustrates resources being reserved for an initial transmission and two retransmissions, the reservation may be for an initial transmission and a single transmission or only for an initial transmission.

The UE may determine an associated signal measurement (such as RSRP) for each resource reservation received by another UE. The UE may consider resources reserved in a transmission for which the UE measures an RSRP below a threshold to be available for use by the UE. A UE may perform signal/channel measurement for a sidelink resource that has been reserved and/or used by other UE(s), such as by measuring the RSRP of the message (e.g., the SCI) that reserves the sidelink resource. Based at least in part on the signal/channel measurement, the UE may consider using/reusing the sidelink resource that has been reserved by other UE(s). For example, the UE may exclude the reserved resources from a candidate resource set if the measured RSRP meets or exceeds the threshold, and the UE may consider a reserved resource to be available if the measured RSRP for the message reserving the resource is below the threshold. The UE may include the resources in the candidate resources set and may use/reuse such reserved resources when the message reserving the resources has an RSRP below the threshold, because the low RSRP indicates that the other UE is distant and a reuse of the resources is less likely to cause interference to that UE. A higher RSRP indicates that the transmitting UE that reserved the resources is potentially closer to the UE and may experience higher levels of interference if the UE selected the same resources.

For example, in a first step, the UE may determine a set of candidate resources (e.g., by monitoring SCI from other UEs and removing resources from the set of candidate resources that are reserved by other UEs in a signal for which the UE measures an RSRP above a threshold value). In a second step, the UE may select N resources for transmissions and/or retransmissions of a TB. As an example, the UE may randomly select the N resources from the set of candidate resources determined in the first step. In a third step, for each transmission, the UE may reserve future time and frequency resources for an initial transmission and up to two retransmissions. The UE may reserve the resources by transmitting SCI indicating the resource reservation. For example, in the example in FIG. 13, the UE may transmit SCI reserving resources for data transmissions 1308, 1310, and 1312.

There may be a timeline for a sensing-based resource selection. For example, the UE may sense and decode the SCI received from other UEs during a sensing window, e.g., a time duration prior to resource selection. Based on the sensing history during the sensing window, the UE may be able to maintain a set of available candidate resources by excluding resources that are reserved by other UEs from the set of candidate resources. A UE may select resources from its set of available candidate resources and transmits SCI reserving the selected resources for sidelink transmission (e.g., a PSSCH transmission) by the UE. There may be a time gap between the UE's selection of the resources and the UE transmitting SCI reserving the resources.

In some aspects, a UE may serve as a scheduler for one or more other UEs and may allocate resources to the other UEs for sidelink transmissions. Having a UE allocate the resources to be used by one or more other UEs for sidelink transmissions may help to manage congestion, mitigate conflicts, improve QoS, improve efficient use of the wireless spectrum, and/or simplify channel access.

Figure 4:
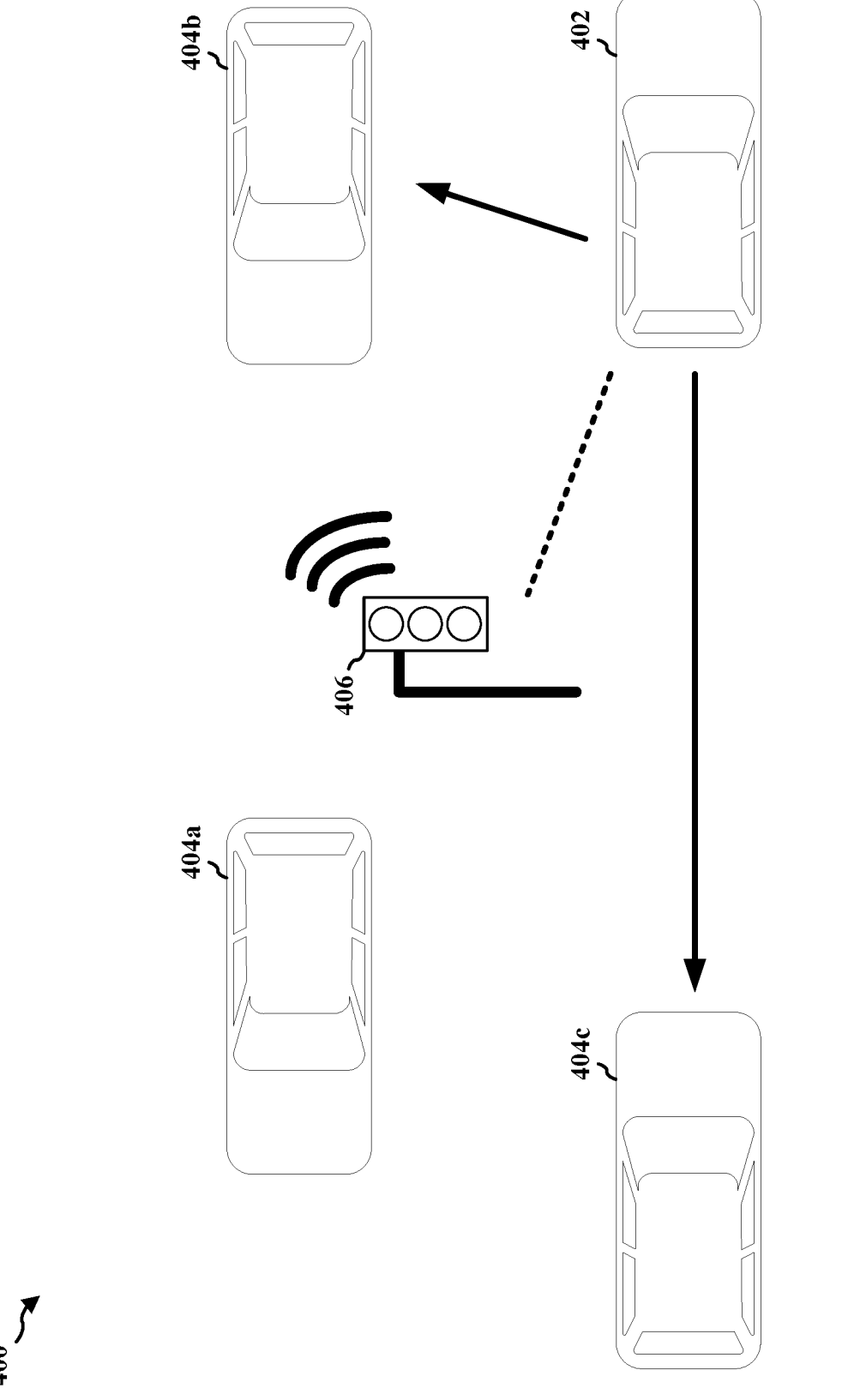
FIG. 4 illustrates a diagram including sidelink user equipments (UEs) that may be scheduled via a central scheduler for one or more sidelink communications.

FIG. 4 illustrates a diagram 400 including sidelink UEs 404a-404c that may be scheduled via a central scheduler 402 for one or more sidelink communications. In examples, the central scheduler 402 may also be a sidelink UE, such as a vehicular UE, a roadside unit (RSU), a mobile device, etc. Central scheduling techniques in sidelink communication environments may be performed to reduce a number of instances where sidelink UEs in proximity to each other attempt to utilize a same set of time and frequency resources for the one or more sidelink communications. The sidelink UEs 404a-404c may execute one or more predetermined protocols to designate a particular UE to serve as the central scheduler 402 for the sidelink UEs 404a-404c. For example, the central scheduler 402 may be selected based on a voting procedure of the sidelink UEs 404a-404c. in some aspects, the central scheduler 402 may be in communication with an RSU 406, which may communicate with a base station and/or other devices in the sidelink communication environment.

In the diagram 400, four vehicular UEs in proximity to each other may mutually determine to designate one of the four vehicular UEs as the central scheduler 402 for all of the vehicular UEs. The central scheduler 402 may then manage congestion in the sidelink communication environment based on scheduling the one or more sidelink communications of the sidelink UEs 404a-404c and/or the central scheduler 402 in a manner that manipulates (e.g., reduces) a number of the sidelink UEs that are transmitting at a given time. Without the central scheduler 402, the sidelink UEs 404a-404c may transmit sidelink communications in a distributed manner, where a plurality of the sidelink UEs may attempt to access a channel simultaneously. That is, without the central scheduler, a first sidelink UE 404a may attempt to access the channel/transmit a same time as a second sidelink UE 404b and/or a third sidelink UE 404c. Simultaneous access of channel by a plurality of UEs may be referred to as congestion. Thus, the central scheduler 402 may indicate particular slots in which each of the sidelink UEs 404a-404c may transmit, such that congestion in the sidelink communication environment may be reduced.

The central scheduler 402 may also reduce scheduling conflicts for UEs that are operating in a half-duplex mode, where such UEs may not transmit and receive communications simultaneously. Without the central scheduler 402, each of the sidelink UEs 404a-404c may not be able to determine which of the other sidelink UEs 404a-404c are operating in the half-duplex mode. Thus, the first sidelink UE 404a may transmit a sidelink communication to the second sidelink UE 404b in a same slot that the second sidelink UE 404b is using to transmit a different sidelink communication to the third sidelink UE 404c. If the second sidelink UE 404b is operating in the half-duplex mode, the second sidelink UE 404b may not receive the sidelink communication from the first sidelink UE 404a at the same time the second sidelink UE 404b is transmitting the different sidelink communication to the third sidelink UE 404c. Hence, the central scheduler 402 may schedule the first sidelink UE 404a, the second sidelink UE 404b, and the third sidelink UE 404c in a manner that mitigates occasions where half-duplex UEs have transmissions and receptions that are attempted to be communicated at a same time.

The central scheduler 402 may be configured to provide a threshold quality of service (QoS) based on a certain level of reliability. For example, sidelink communications performed in a distributed communication environment (e.g., without a central scheduler 402) having a high amount of congestion, half-duplex communication conflicts, etc., may be associated with collisions that cause the QoS to be below the threshold QoS. The central scheduler 402 being able to assign certain slots to certain sidelink UEs may be able to increase the reliability of sidelink communications to satisfy the threshold QoS.

The central scheduler 402 may also provide a more efficient utilization of the spectrum. For example, the sidelink UEs 404a-404b may not have to perform a listen-before-talk (LBT) procedure if the sidelink UEs 404a-404c are scheduled by the central scheduler 402. That is, the sidelink UEs 404a-404c may not be accessing the channel at random to perform respective LBT procedures. Instead, the central scheduler 402 may indicate to each of the sidelink UEs 404a-404c when the channel is being used by one or more different sidelink UEs, which may provide more simplified access to the channel by the sidelink UEs 404a-404c.

In some aspects, a UE (404a, 404b, or 404c), which may be referred to as a scheduled UE, may send a scheduling request to the scheduler UE (e.g., central scheduler 402). The scheduler UE may respond with a grant allocating sidelink resources to the UE that transmitted the scheduling request. The scheduled UE may then use the sidelink resources allocated in the grant to transmit and/or retransmit a sidelink communication, e.g., including PSSCH. Example aspects of a scheduling request and grant are illustrated in connection with FIG. 5 and FIG. 7.

In some aspects, one or more UEs in the area may exchange sidelink communication that is not scheduled by the scheduler UE. For example, one or more UEs may use mode 2 resource allocation, e.g., sensing based resource selection. Aspects presented herein provide for scheduling resources for sidelink communication in a manner that helps to avoid collisions with UEs that are not scheduled by the scheduler UE.

Figure 5:
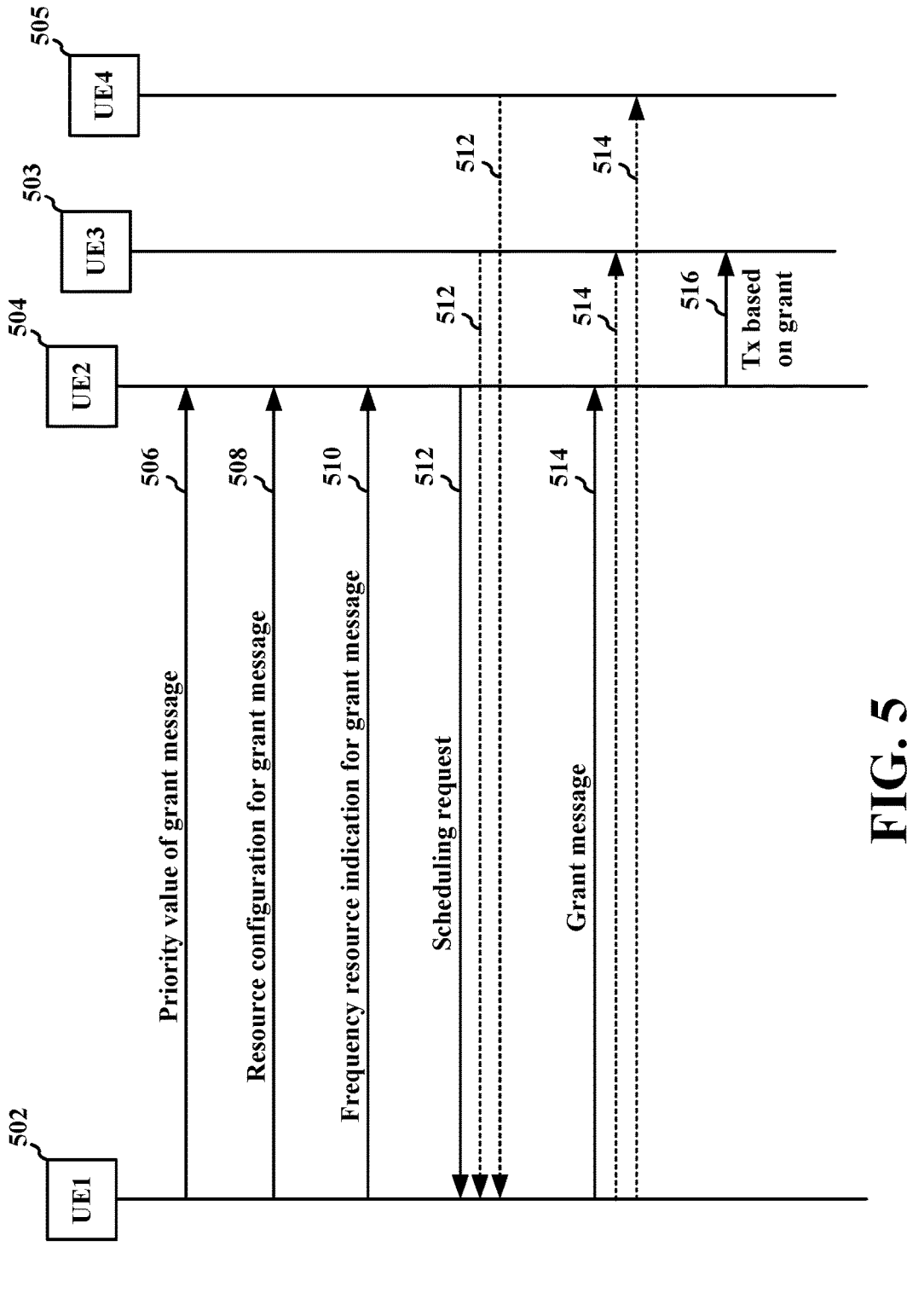
FIG. 5 is a call flow diagram illustrating communications between a first UE and a second UE.

FIG. 5 is a call flow diagram 500 illustrating communications between a first UE 502 and a second UE 504. The first UE 502 may operate as a central scheduler that schedules one or more other sidelink UEs (e.g., 503-505) in proximity to the central scheduler/first UE 502 for sidelink communications. Although the first UE 502 is described as a central UE, the term refers to the action of the UE in allocating resources to the other UEs (e.g., 503-505) and not necessarily to a central physical location. In other aspects, the first UE 502 may be referred to as a scheduler UE or a designated UE. The second UE 504 may be included in the one or more other sidelink UEs (e.g., 503-505) and may operate as a scheduled UE that is scheduled by the first UE 502.

The first UE 502 may indicate, at 506, a priority value of a grant message to the second UE 504. In aspects, the priority value of the grant message may be indicated in a broadcast message, a groupcast message, or in an additional unicast message that is received by additional sidelink UEs, such as a third UE 503, a fourth UE 505, etc. The priority value may prioritize sidelink communication resources for sidelink UE communications over the grant message. That is, the resource reservation for the sidelink UE communications may be based on a pro-UE implementation. Pro-UE implementation refers to a first resource reservation for one or more sidelink transmissions that has a higher priority than a second resource reservation for a next grant transmission. In some aspects, the priority value may be indicated, at 506, for the grant message transmitted at 514. A grant message may refer to a sidelink message from one UE that grants, allocates, or otherwise indicates sidelink resources that are available for use by one or more UEs, such as the UE 504. In some aspects, the priority value may be indicated, at 506, prior to the transmission of a particular sidelink grant message. In some aspects, the priority value may be known, such as being based on a defined value or a known value, and may be known to the other UEs (e.g., 503-505) without additional signaling of the priority value from the first UE 502.

The first UE 502 may configure, or otherwise indicate in advance, resources for the grant message prior to transmission of the grant message, at 514, to the second UE 504 and/or the other UEs, such as the third UE 503, the fourth UE 505, etc. The resource configuration for the grant message may be transmitted, at 508, to the second UE 504. In aspects, the resource configuration for the grant message may be transmitted, at 508, to additional sidelink UEs, such as the third UE 503, the fourth UE 505, etc. At 510, the first UE may transmit a frequency resource indication for the grant message. That is, the first UE 502 may indicate the frequency of resources on which the grant message may be transmitted, e.g., resources that are designated for use to transmit the grant message. In some aspects, the frequency resource indication for the grant message may be indicated as part of the resource configuration for the grant message. In further aspects, the sidelink transmission, at 510, with the frequency resource indication for the grant message may be unicast to the UE 2, or may be broadcast or groupcast so that it may be received by additional sidelink UEs, such as the third UE 503, the fourth UE 505, etc.

At 512, the first UE 502 may receive a scheduling request from the second UE 504 for scheduling a sidelink transmission of the second UE 504. The first UE 502 may schedule, grant, or allocate sidelink resources for one or more UEs. In aspects, the additional UEs, such as the third UE 503 and the fourth UE 505, may also transmit, at 512, scheduling requests to the first UE 502. The first UE 502 may determine whether to grant or deny the scheduling request(s) received, at 512, from the second UE 504, the third UE 503, and/or the fourth UE 505. If the scheduling request received, at 512, from the second UE 504 is denied by the first UE 502, the second UE 504 may refrain from communicating on sidelink resources that correspond to the scheduling request. Alternatively, the first UE 502 may respond to the scheduling request received, at 512, with a grant of sidelink resources by transmitting, at 514, one or more scheduling grants (e.g., grant messages) to the second UE 504, the third UE 503, and/or the fourth UE 505. The grant message may include SCI-1 and/or SCI-2, e.g., as described in more detail in connection with FIGS. 6-7.

At 516, the second UE 504 may transmit a sidelink transmission to another sidelink UE, such as the third UE 503 based on the grant message received, at 514, from the first UE 502. The grant message 514 may be a unicast sidelink message, a broadcast sidelink message, or a groupcast sidelink message. If the grant message 514 is a broadcast or groupcast, the grant message 514 may also be received by the third UE 503 and/or the fourth UE 505 in addition to the second UE 504. In aspects, the second UE 504 may transmit additional or alternative sidelink transmissions other sidelink UEs, such as the first UE 502 and/or the fourth UE 505, based on the grant message received, at 514, from the first UE 502. The third UE 503 and/or the fourth UE 505 may similarly transmit one or more sidelink transmissions to one or more other sidelink UEs based on the grant message received, at 514, from the first UE 502.

Along with the transmission, at 514, granting the resources, the first UE 502 may transmit (e.g., with the grant message) a resource reservation for other UE transmissions. The grant message 514 may include an allocation of resources for multiple UEs, in some aspects. An SCI bit or an SCI format may be used to indicate that the resource reservation for the other UE transmissions is included with the grant message. For example, one or more SCI bit in the SCI-1 may indicate whether the resource information in the SCI-1 is a grant of sidelink resources to another UE or is the first UE's own reservation. In some aspects, one or more SCI bit in the SCI-2 may indicate whether or not the resource information in the SCI-1 is a grant of sidelink resources for another UE. In some aspects, the SCI format of the corresponding SCI-2 may indicate whether or not the resource information in the SCI-1 includes a grant of sidelink resources to another UE. In some aspects, the bit may be a reserved bit. For example, the one or more bit may indicate a type of the sidelink message, e.g., whether or not the SCI-1 is a type that contains a grant or may indicate a type of resource reservation, e.g., whether or not the resource reserved in the SCI-1 is for the first UE's next transmission. In aspects, the SCI-1 may indicate resources to be used for sidelink transmissions, e.g., as described in connection with FIG. 13. Receiving UEs, e.g., which may not be an intended recipient of a corresponding PSSCH, may use the resource reservation information in the SCI-1 to avoid selecting overlapping sidelink resources for their own sidelink transmissions. By indicating resources for a scheduled transmission, the other scheduler UEs may help to prevent interference to the scheduled transmission by enabling the other scheduler UEs to avoid using the same resources for a different sidelink transmission.

In some aspects, the first UE 502 may provide signaling indicating dedicated resources or preconfigured resources, so that other sidelink UEs avoid the dedicated resources or preconfigured resources for other UE communications. For example, the dashed lines of 514 illustrate that other UEs, e.g., such as the third UE 503 or the fourth UE 505, may receive the grant message, e.g., at least a portion of the grant message that includes the resource reservation. In aspects, the grant message may be a single message, and the additional dashed lines are merely to illustrate that the single message may be received by multiple UEs, e.g., including one or more scheduled UEs and one or more non-scheduled UEs. In some aspects, sidelink UEs that receive the grant message may not be scheduled by the first UE 502. The sidelink UEs may use a different type of resource allocation, such as a mode 2 or sensing-based resource allocation, such as described in connection with FIG. 13. Additional example aspects of the grant message 514 are described in connection with FIG. 6 and FIG. 7.

Figure 6:
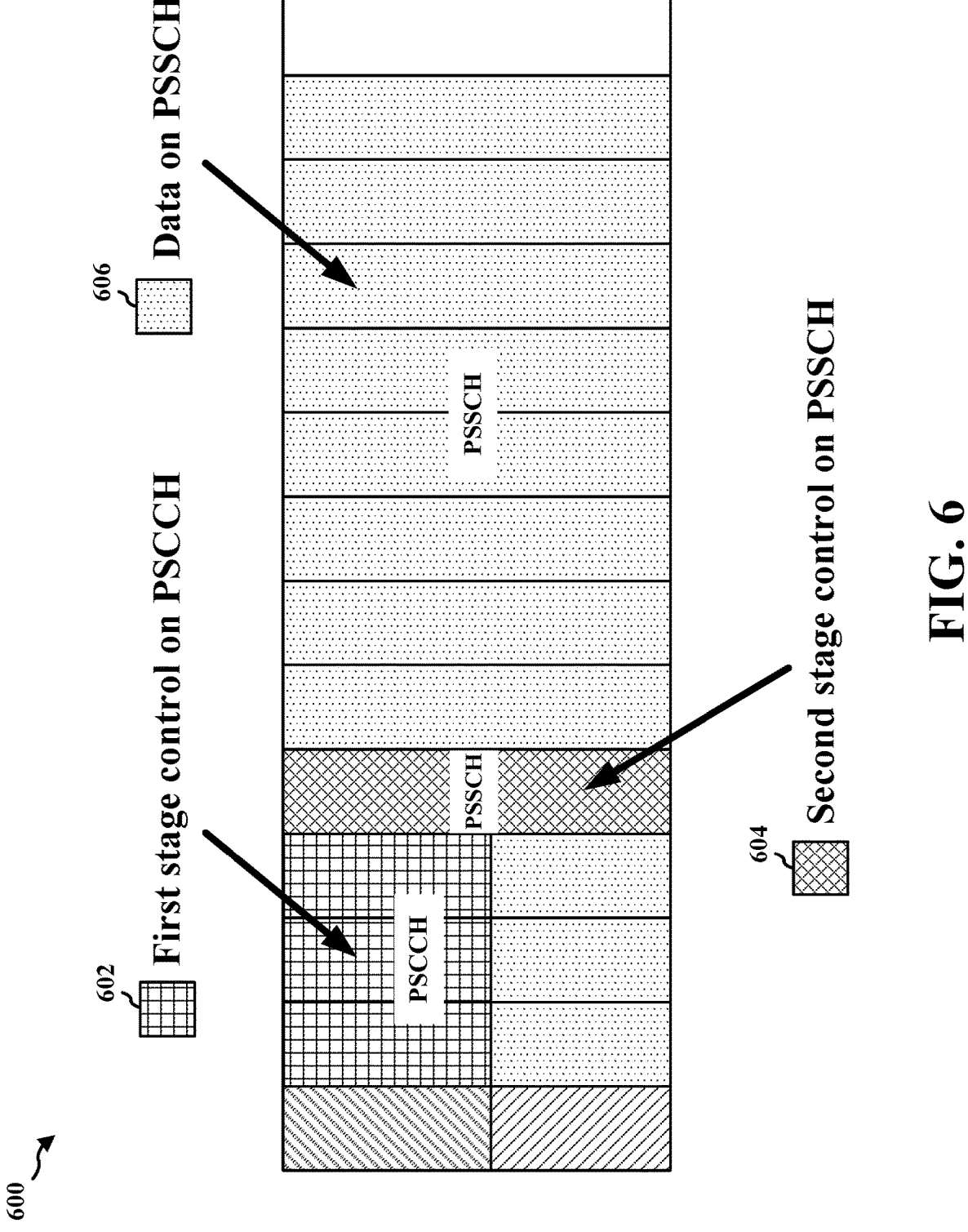
FIG. 6 is a diagram of a sidelink slot structure.

FIG. 6 is a diagram 600 of a sidelink slot structure. The sidelink slot structure may be used to transmit the sidelink grant messages, e.g., as described in connection with FIG. 5. In some aspects, a UE receiving a grant message may not be able to determine the purpose for which a particular set of reserved resources will be used, but the UE may be able to determine that the particular set of resources are, in fact, reserved and may therefore avoid using the resources based on the reserved status.

The sidelink slot structure may include both first stage control information 602 (e.g., SCI-1) and second stage control information 604 (e.g., SCI-2). The first stage control information 602 may be transmitted on PSCCH and the second stage control information 604 may be transmitted on PSSCH. The sidelink slot structure may also include data 606, which may likewise be transmitted on the PSSCH. In examples, the first stage control information 602 and the second stage control information 604 may be transmitted at locations of the sidelink slot structure based on channels and signaling associated with the NR framework/format.

A UE (such as the UEs 503-505) may receive the first stage control information 602 (e.g., SCI-1) from a scheduler (e.g., the first UE 502). A resource reservation for UE transmission may be included in the first stage control information 602 transmitted on the PSCCH. Either an SCI bit or an SCI format may be used to indicate that the resource reservation for the UE transmission is included with a current grant message. For example, the sidelink grant message transmitted, at 514, may include SCI-1 and corresponding SCI-2.

A format of the second stage control information 604 (e.g., SCI-2) transmitted on the PSSCH may indicate that the first stage control information 602 (e.g., SCI-1) transmitted on the PSCCH includes the resource reservation for the UE transmission. The second stage control information 604 transmitted on the PSSCH may include a scheduler identifier (ID) for the central scheduler. The second stage control information 604 may also include one or more resource assignment fields for a grant message transmitted to one or more scheduled UEs.

Figure 7:
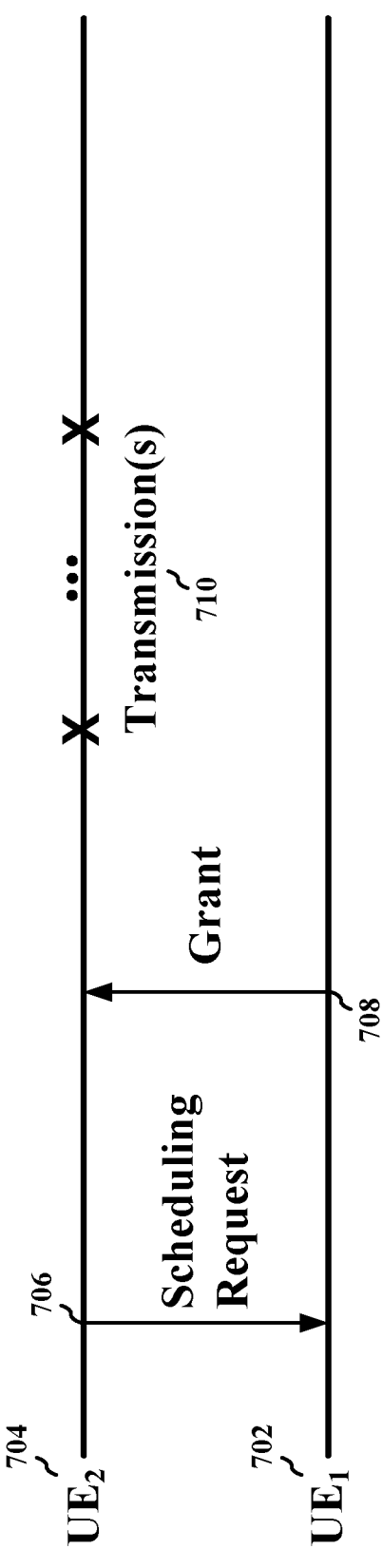
FIG. 7 is a diagram associated with a scheduling request for sidelink communication resources.

FIG. 7 is a diagram 700 associated with a scheduling request 706 for sidelink communication resources. In the diagram 700, a first UE 702 (e.g., UE$_1$) may be the central scheduler for one or more other sidelink UEs, such as a second UE 704 (e.g., UE$_2$). The second UE 704 may transmit the scheduling request 706 to the first UE 702 for scheduling a sidelink communication of the second UE 704. The first UE 702 may determine whether to grant the scheduling request 706 for the sidelink communication resources. For example, if the first UE 702 determines to grant the scheduling request 706, the first UE 702 may transmit a grant message 708 to the second UE 704. Thus, the second UE 704 may be a scheduled UE of the central scheduler (e.g., first UE 702). After the scheduled UE (e.g., second UE 704) receives the grant message 708 for the sidelink communication resources, the scheduled UE/second UE 704 may perform one or more transmissions 710 on the granted resources. In some cases, the one or more transmissions of the second UE 704 may be one or more re-transmissions.

For UE scheduling, the central scheduler/first UE 702 may transmit the grant message 708 to one or more scheduled UEs, such as the second UE 704. However, signaling of the grant message 708 to the second UE 704 may be performed such that the one or more transmissions 710 of the scheduled UE/second UE 704 includes a higher priority than the grant message 708 transmitted by the central scheduler/first UE 702. For example, the one or more transmissions 710 may have a higher priority than the grant message 708 to ensure that the one or more transmissions 710 are communicated from the second UE 704, if the resources of the grant message 708 overlap with resources of the one or more transmissions 710.

SCI-1 may be utilized to reserve the sidelink communication resources of the one or more transmissions 710. For example, if the SCI-1 is utilized to reserve resources for a UE transmission, then such transmissions may be prioritized based on a pro-UE implementation. In contrast, if the sidelink communication resources are reserved for a next grant message transmitted to the second UE 704, the next grant message may be prioritized based on a pro-scheduler implementation. Again, the one or more transmissions 710 may be prioritized over transmissions of the grant message 708 to ensure that the sidelink resources are reserved for the one or more transmissions 710 of the scheduled UE/second UE 704.

The grant message 708 for the scheduled UE/second UE 704 may be transmitted on configured/dedicated scheduler resources, as the SCI-1 may be used to reserve the resources for the one or more transmissions 710. The scheduled UE/second UE 704 may determine the dedicated resources based on an indication from the central scheduler/first UE 702. In examples, the dedicated resources may be indicated periodically by the central scheduler/first UE 702. A frequency of the scheduler resources for the second UE 704 may be configured/pre-configured, or the frequency of the scheduler resources may be signaled by the central scheduler/first UE 702. However, certain UEs (e.g., legacy UEs)

may be unaware that the resources are configured, which may result in interference associated with the resources.

Accordingly, granted resources may be indicated in SCI-1. The granted resources may correspond to resources for the one or more transmissions 710, as opposed to resources for a next scheduled grant message. The SCI-1 may include a time domain resource allocation (TDRA) field and/or a frequency domain resource allocation (FDRA) field that indicates the granted resources. As an example, the TDRA and/or FDRA fields of an SCI-1 in a grant message 708 (e.g., which may correspond to 514) from the first UE 702 may indicate the sidelink resources granted or allocated to the second UE 704. In a first aspect, the grant message 708 may be periodic, where the period may be indicated in a reservation period field. In some aspects, the granted resources may be periodic resources, and a period associated with the granted resources for the second UE 704 may be indicated in a reservation period field of the SCI-1. The TDRA, the FDRA, and the reservation period values of the scheduler resources may be configured/pre-configured per resource pool. When granting resources to scheduled UEs, the grant message 708 may be selected across the resource pools. For example, first resources may be selected from a resource pool and second resources may be selected from a second resource pool, where each resource pool may be associated with different TDRA, FDRA, and/or reservation period values.

In a second aspect, the resources granted in the grant message 708 may be aperiodic. The SCI-1 may be used to reserve up to two future resources, which may be in contrast to SCI-2 reservations that may support grants of more resources. In some aspects, a format of the SCI-1 may only include enough space to reserve, or indicate, a limited number of resources. In some aspects, the limited number may be up to two future resources. As described in connection with FIG. 13, the SCI-1 may be used to indicate resource reservations for a UE's own sidelink transmission, and as presented herein, the resource reservation information in the SCI-1 may be used to grant or otherwise indicate sidelink resources for another UE. Either a previously-reserved bit or the SCI-2 format may indicate that the SCI-1 includes a grant. Further, either the previously-reserved bit may be used to indicate that the reserved resource is not for a next transmission of the central scheduler/first UE 702, or the indication may be pre-configured. That is, one of the reserved bits may be used to indicate that the SCI includes the grant and that the grant is not for the next grant transmission, but for a resource reservation of one or more other UEs. The SCI-1 or the SCI-2 format may indicate the grant and the additional bit. As the resource reservation is for one or more other UEs, the additional bit may indicate that the reservation is not for the next grant transmission of the central scheduler/first UE 702. A priority value associated with the sidelink grant may also be indicated or configured/pre-configured.

While SCI-1 may include information indicative of resources that are being reserved, the SCI-1 may be limited to a maximum number of future resources reservations, such as a maximum number of two future resource reservations. SCI-2 may be used to assign resources in the SCI-1 to one or more UEs. For example, the one or more UEs may be assigned resources based on a scheduler ID of the central scheduler/first UE 702. A scheduled UE ID, a HARQ process ID, an ID mapping the grant message 708 to the scheduling request 706, and/or a scheduled UE ID mapping to resources in the SCI-1 may be indicated for each of the two resources reserved in the SCI-1. For instance, one or more resource assignment fields may be indicated that correspond to each scheduled UE, which may include one or more of the scheduled UE ID, the HARQ process ID, the ID mapping the grant message 708 to the scheduling request 706, or the scheduled UE ID mapping to the resources reserved in SCI-1. Since the SCI-1 may correspond to two reserved resources, a mapping to the two reserved resources may be included in the resource assignment field. While the reserved resources may be indicated in SCI-1, an assignment of the reserved resources to the one or more UEs may be indicated in SCI-2. Thus, a mapping may be used to indicate which resources are for which of the one or more UEs.

In addition to, or alternative to, granted resources indicated in the SCI-1, the corresponding SCI-2 may also indicate additional granted resources. For example, the SCI-1 may reserve a maximum of two resources, and the SCI-2 may reserve additional grants of resources in addition to the two resources reserved by the SCI-1. The resource assignment field (e.g., for reserving the additional granted resources) may be indicative of one or more of an FDRA, a TDRA, a period, an MCS index, an MCS table, a DMRS port indication, or beta_offset indicator. The resource assignment field may also be indicative of the scheduled UE ID mapping to the resources reserved in the SCI-1. A grant message 708 for the additional granted resources may exclude the scheduler ID, as the scheduler ID may be indicated in a resource assignment field. The SCI-2 format may include more space for reserving, or indicating, the additional granted resources than may be provided via the SCI-1.

Figure 8:
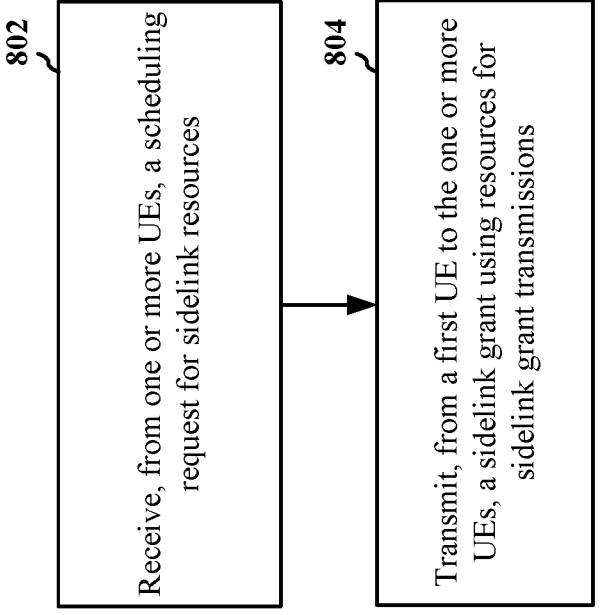
FIG. 8 is a flowchart of a method of wireless communication at a first UE.

FIG. 8 is a flowchart 800 of a method of wireless communication. The method may be performed by a central scheduler/first UE (e.g., the UE 104, 402, 502, 702; the apparatus 1202; etc.), which may include the memory 360 and which may be the entire UE 104, 402, 502, 702 or a component of the UE 104, 402, 502, 702, such as the TX processor 368, the RX processor 356, and/or the controller/processor 359. The method may be performed to increase a reliability of UE transmissions on sidelink resources.

At 802, the first UE may receive, from one or more UEs, a scheduling request for sidelink resources. For example, referring to FIGS. 5 and 7, the first UE 502 may receive, at 512, a scheduling request from the second UE 504, the third UE 503, and/or the fourth UE 505. In the diagram 700, the first UE 702 may receive a scheduling request 706 from the second UE 704. The reception, at 802, may be performed by the reception component 1230 of the apparatus 1202 in FIG. 12.

At 804, the first UE may transmit, from a first UE to the one or more UEs, a sidelink grant using resources for sidelink grant transmissions. For example, referring to FIGS. 5 and 7, the first UE 502 may transmit, at 514, a grant message to the second UE 504, the third UE 503, and/or the fourth UE 505. In the diagram 700, the first UE 702 may transmit a grant message 708 to the second UE 704. The transmission, at 804, may be performed by the transmission component 1234 of the apparatus 1202 in FIG. 12.

Figure 9:
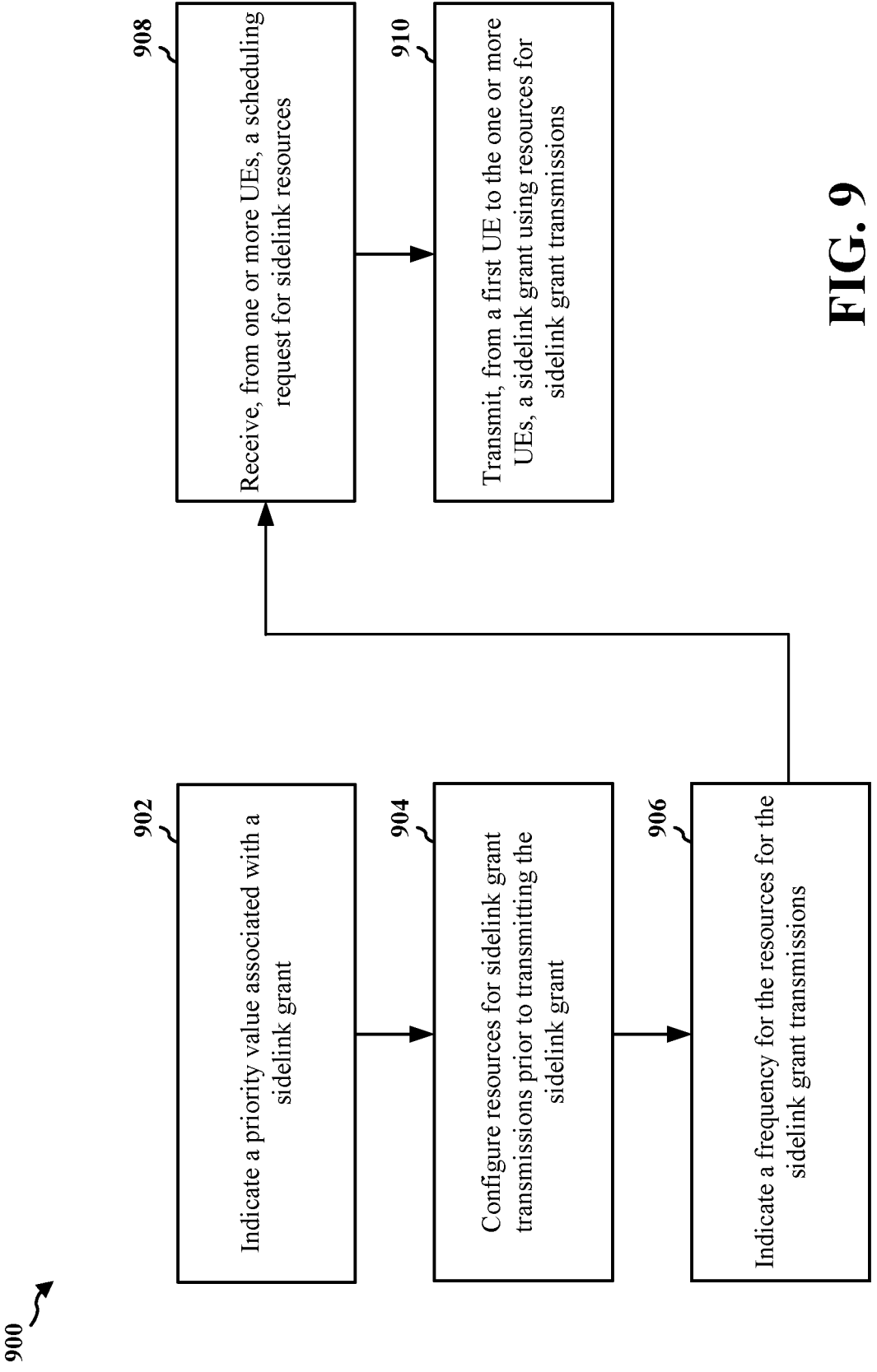
FIG. 9 is a flowchart of a method of wireless communication at a first UE.

FIG. 9 is a flowchart 900 of a method of wireless communication. The method may be performed by a central scheduler/first UE (e.g., the UE 104, 402, 502, 702; the apparatus 1202; etc.), which may include the memory 360 and which may be the entire UE 104, 402, 502, 702 or a component of the UE 104, 402, 502, 702, such as the TX processor 368, the RX processor 356, and/or the controller/processor 359. The method may be performed to increase a reliability of UE transmissions on sidelink resources.

At 902, the first UE may indicate a priority value associated with a sidelink grant. For example, referring to FIG. 5, the first UE 502 may indicate, at 506, a priority value of a grant message to the second UE 504. The indication, at 902, may be performed by the indication component 1240 of the apparatus 1202 in FIG. 12.

At 904, the first UE may configure resources for sidelink grant transmissions prior to transmitting the sidelink grant. For example, referring to FIG. 5, the first UE 502 may indicate, at 508, a resource configuration for a grant message prior to transmitting, at 514, the grant message to the second UE 504, the third UE 503, and/or the fourth UE 505. The configuration, at 904, may be performed by the configuration component 1242 of the apparatus 1202 in FIG. 12.

At 906, the first UE may indicate a frequency for the resources for the sidelink grant transmissions. For example, referring to FIG. 5, the first UE 502 may transmit, at 510, a frequency resource indication for the grant message to the second UE 504. The indication, at 906, may be performed by the indication component 1240 of the apparatus 1202 in FIG. 12.

At 908, the first UE may receive, from one or more UEs, a scheduling request for sidelink resources. For example, referring to FIGS. 5 and 7, the first UE 502 may receive, at 512, a scheduling request from the second UE 504, the third UE 503, and/or the fourth UE 505. In the diagram 700, the first UE 702 may receive a scheduling request 706 from the second UE 704. The reception, at 908, may be performed by the reception component 1230 of the apparatus 1202 in FIG. 12.

At 910, the first UE may transmit, from a first UE to the one or more UEs, a sidelink grant using resources for sidelink grant transmissions. For example, referring to FIGS. 5 and 7, the first UE 502 may transmit, at 514, a grant message to the second UE 504, the third UE 503, and/or the fourth UE 505. In the diagram 700, the first UE 702 may transmit a grant message 708 to the second UE 704. The transmission, at 910, may be performed by the transmission component 1234 of the apparatus 1202 in FIG. 12.

Figure 10:
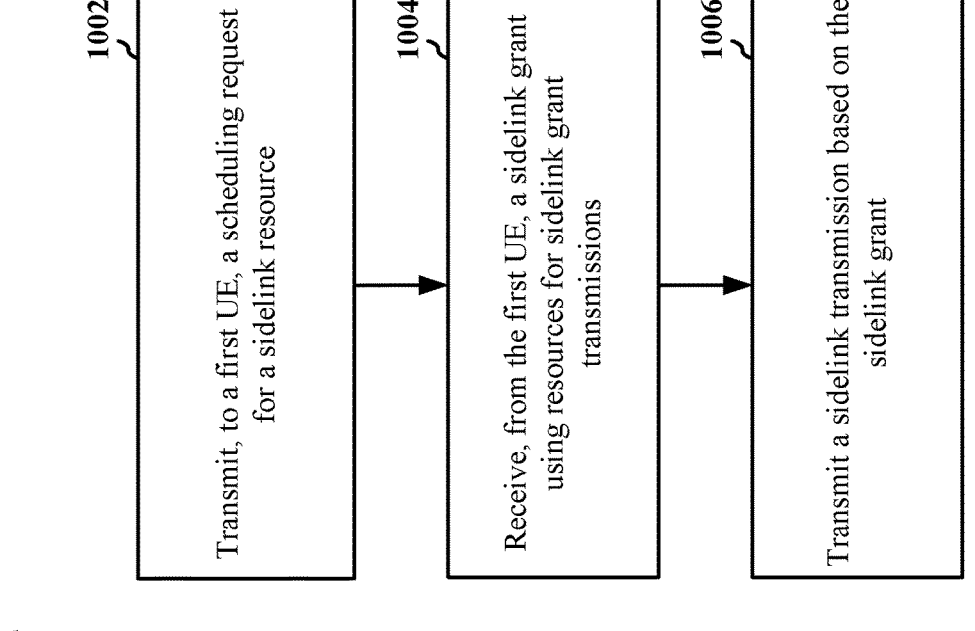
FIG. 10 is a flowchart of a method of wireless communication at a second UE.

FIG. 10 is a flowchart 1000 of a method of wireless communication. The method may be performed by a second UE (e.g., the UE 104, 404a-404c, 504, 704; the apparatus 1202; etc.), which may include the memory 376 and which may be the entire second UE 104, 404a-404c, 504, 704 or a component of the second UE 104, 404a-404c, 504, 704, such as the TX processor 316, the RX processor 370, and/or the controller/processor 375. The method may be performed to increase a reliability of UE transmissions on sidelink resources.

At 1002, the second UE may transmit, to a first UE, a scheduling request for a sidelink resource. For example, referring to FIGS. 5 and 7, the second UE 504 may transmit, at 512, a scheduling request to the first UE 502. In the diagram 700, the second UE 704 may transmit a scheduling request 706 to the first UE 702. The transmission, at 1002, may be performed by the transmission component 1234 of the apparatus 1202 in FIG. 12.

At 1004, the second UE may receive, from the first UE, a sidelink grant using resources for sidelink grant transmissions. For example, referring to FIGS. 5 and 7, the second UE 504 may receive, at 514, a grant message from the first UE 502. In the diagram 700, the second UE 704 may receive a grant message 708 from the first UE 702. The reception, at 1004, may be performed by the reception component 1230 of the apparatus 1202 in FIG. 12.

At 1006, the second UE may transmit a sidelink transmission based on the sidelink grant. For example, referring to FIGS. 5 and 7, the second UE 504 may transmit, at 516, a sidelink transmission based on the grant message received, at 514, from the first UE 502. In the diagram 700, the second UE 704 may transmit the one or more transmissions 710 based on the grant message 708 received from the first UE 702. The transmission, at 1006, may be performed by the transmission component 1234 of the apparatus 1202 in FIG. 12.

FIG. 11 is a flowchart 1100 of a method of wireless communication. The method may be performed by a second UE (e.g., the UE 104, 404a-404c, 504, 704; the apparatus 1202; etc.), which may include the memory 376 and which may be the entire second UE 104, 404a-404c, 504, 704 or a component of the second UE 104, 404a-404c, 504, 704, such as the TX processor 316, the RX processor 370, and/or the controller/processor 375. The method may be performed to increase a reliability of UE transmissions on sidelink resources.

At 1102, the second UE may receive a priority value associated with a sidelink grant. For example, referring to FIG. 5, the second UE 504 may receive, at 506, a priority value of a grant message from the first UE 502. The reception, at 1102, may be performed by the reception component 1230 of the apparatus 1202 in FIG. 12.

At 1104, the second UE may receive a configuration of resources for sidelink grant transmissions prior to a transmission of the sidelink grant. For example, referring to FIG. 5, the second UE 504 may receive, at 508, a resource configuration for a grant message prior to receiving, at 514, the grant message from the first UE 502. The reception, at 1104, may be performed by the reception component 1230 of the apparatus 1202 in FIG. 12.

At 1106, the second UE may receive, from a first UE an indication of a frequency for the resources for the sidelink grant transmissions. For example, referring to FIG. 5, the second UE 504 may receive, at 510, a frequency resource indication for the grant message from the first UE 502. The reception, at 1106, may be performed by the reception component 1230 of the apparatus 1202 in FIG. 12.

At 1108, the second UE may transmit, to the first UE, a scheduling request for a sidelink resource. For example, referring to FIGS. 5 and 7, the second UE 504 may transmit, at 512, a scheduling request to the first UE 502. In the diagram 700, the second UE 704 may transmit a scheduling request 706 to the first UE 702. The transmission, at 1108, may be performed by the transmission component 1234 of the apparatus 1202 in FIG. 12.

At 1110, the second UE may receive, from the first UE, the sidelink grant using the resources for the sidelink grant transmissions. For example, referring to FIGS. 5 and 7, the second UE 504 may receive, at 514, a grant message from the first UE 502. In the diagram 700, the second UE 704 may receive a grant message 708 from the first UE 702. The reception, at 1110, may be performed by the reception component 1230 of the apparatus 1202 in FIG. 12.

At 1112, the second UE may transmit a sidelink transmission based on the sidelink grant. For example, referring to FIGS. 5 and 7, the second UE 504 may transmit, at 516, a sidelink transmission based on the grant message received, at 514, from the first UE 502. In the diagram 700, the second UE 704 may transmit the one or more transmissions 710 based on the grant message 708 received from the first UE 702. The transmission, at 1112, may be performed by the transmission component 1234 of the apparatus 1202 in FIG. 12.

Figure 12:
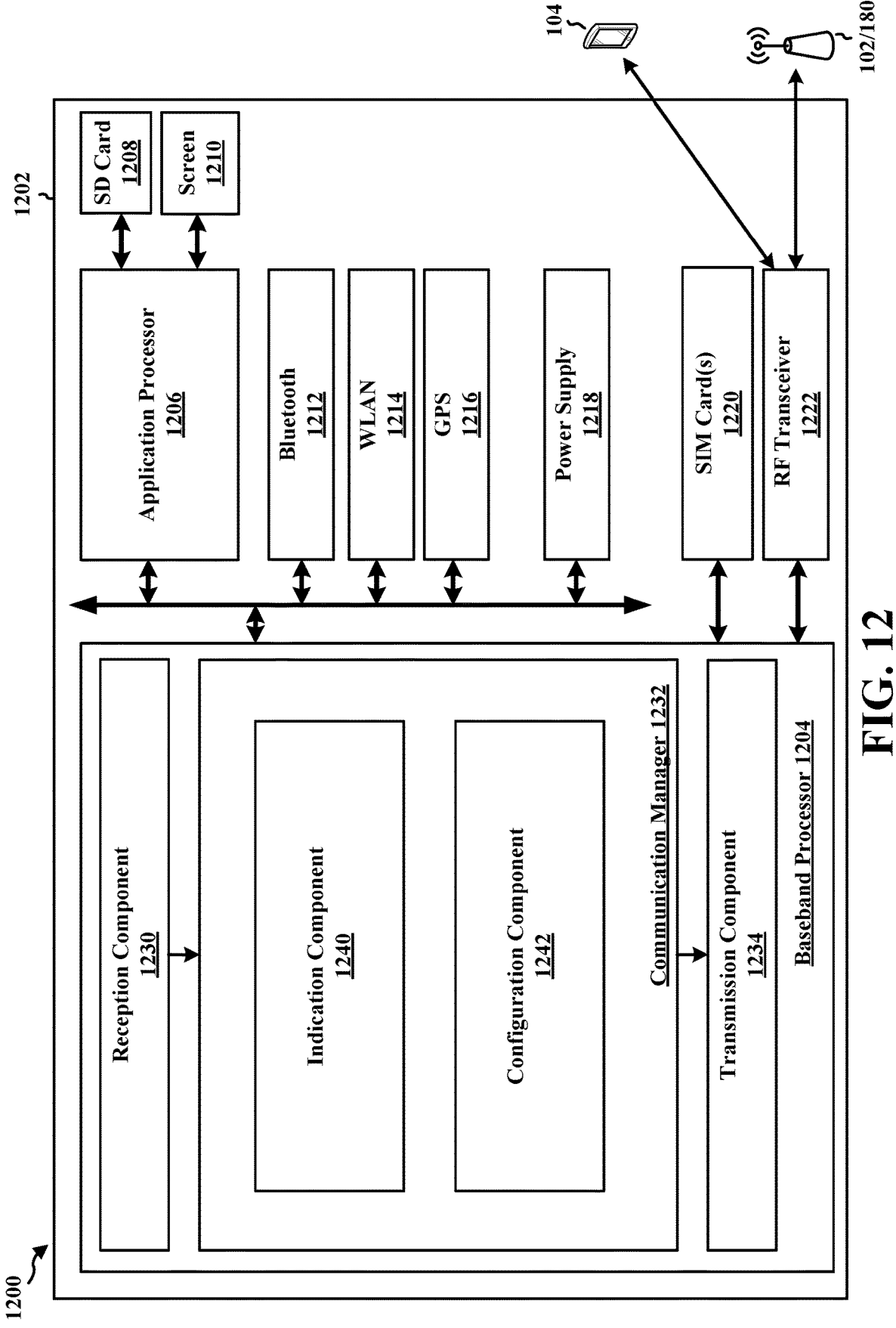
FIG. 12 is a diagram illustrating an example of a hardware implementation for an example apparatus.

FIG. 12 is a diagram 1200 illustrating an example of a hardware implementation for an apparatus 1202. The apparatus 1202 may be a UE, a component of a UE, or may implement UE functionality. In some aspects, the apparatus 1202 may include a cellular baseband processor 1204 (also referred to as a modem) coupled to a cellular RF transceiver 1222. In some aspects, the apparatus 1202 may further include one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, or a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the additional modules of the apparatus 1202.

The reception component 1230 is configured, e.g., as described in connection 802, 908, 1004, 1102, 1104, 1106, and 1110, to receive, from one or more UEs, a scheduling request for sidelink resources; receive a priority value associated with a sidelink grant; receive a configuration of resources for sidelink grant transmissions prior to a transmission of the sidelink grant; receive, from a first UE an indication of a frequency for the resources for the sidelink grant transmissions; and receive, from the first UE, the sidelink grant using the resources for the sidelink grant transmissions.

The communication manager 1232 includes an indication component 1240 that is configured, e.g., as described in connection with 902 and 906, to indicate a priority value associated with a sidelink grant; and to indicate a frequency for the resources for the sidelink grant transmissions. The communication manager 1232 further includes a configuration component 1242 that is configured, e.g., as described in connection with 904, to configure resources for sidelink grant transmissions prior to transmitting the sidelink grant.

The transmission component 1234 is configured, e.g., as described in connection with 804, 910, 1002, 1006, 1108, and 1112, to transmit, from a first UE to the one or more UEs, a sidelink grant using resources for sidelink grant transmissions; to transmit, to the first UE, a scheduling request for a sidelink resource; and to transmit a sidelink transmission based on the sidelink grant.

The apparatus may include additional components that perform each of the blocks of the algorithm in the flowcharts of FIGS. 8-11. As such, each block in the flowcharts of FIGS. 8-11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the cellular baseband processor 1204, includes means for receiving, from one or more UEs, a scheduling request for sidelink resources; and means for transmitting, from the first UE to the one or more UEs, a sidelink grant using resources for sidelink grant transmissions. The apparatus 1202 further includes means for configuring the resources for the sidelink grant transmissions prior to transmitting the sidelink grant. The apparatus 1202 further includes means for indicating a frequency for the resources for the sidelink grant transmissions. The apparatus 1202 further includes means for indicating a priority value associated with the sidelink grant.

In another configuration, the apparatus 1202, and in particular the cellular baseband processor 1204, includes means for transmitting, to a first UE, a scheduling request for a sidelink resource; means for receiving, from the first UE, a sidelink grant using resources for sidelink grant transmissions; and means for transmitting a sidelink transmission based on the sidelink grant. The apparatus 1202 further includes means for receiving a configuration of the resources for the sidelink grant transmissions prior to transmitting the sidelink grant. The apparatus 1202 further includes means for receiving, from the first UE an indication of a frequency for the resources for the sidelink grant transmissions. The apparatus 1202 further includes means for receiving a priority value associated with the sidelink grant.

The means may be one or more of the components of the apparatus 1202 configured to perform the functions recited by the means. As described supra, the apparatus 1202 may include the TX Processor 368, the RX Processor 356, and the controller/processor 359. As such, in one configuration, the means may be the TX Processor 368, the RX Processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a first UE including at least one processor coupled to a memory and configured to receive, from one or more UEs, a scheduling request for sidelink resources; and transmit, from the first UE to the one or more UEs, a sidelink grant using resources for sidelink grant transmissions.

Aspect 2 may be combined with aspect 1 and includes that the resources for the sidelink grant transmissions are dedicated for the sidelink grant transmissions.

Aspect 3 may be combined with any of aspects 1-2 and includes that the at least one processor is further configured to configure the resources for the sidelink grant transmissions prior to transmitting the sidelink grant.

Aspect 4 may be combined with any of aspects 1-3 and includes that the at least one processor is further configured to indicate a frequency for the resources for the sidelink grant transmissions.

Aspect 5 may be combined with any of aspects 1-4 and includes that the sidelink grant is included in a first portion of sidelink control information in a PSCCH.

Aspect 6 may be combined with any of aspects 1-5 and includes that the sidelink grant indicates at least one of a TDRA or an FDRA that are allocated to the one or more UEs.

Aspect 7 may be combined with any of aspects 1-6 and includes that the sidelink grant is for periodic resources and indicates a reservation period.

Aspect 8 may be combined with any of aspects 1-6 and includes that the sidelink grant is for an aperiodic resource.

Aspect 9 may be combined with any of aspects 1-8 and includes that at least one of a sidelink control information bit or sidelink control information format indicates that the SCI-1 includes the sidelink grant.

Aspect 10 may be combined with any of aspects 1-9 and includes that a format of a second portion of sidelink control information in a PSSCH indicates that the SCI-1 includes the sidelink grant.

Aspect 11 may be combined with any of aspects 1-10 and includes that at least one bit of SCI differentiates the sidelink grant for the one or more UEs from a sidelink resource reservation for the first UE.

Aspect 12 may be combined with any of aspects 1-11 and includes that the at least one processor is further configured to indicate a priority value associated with the sidelink grant.

Aspect 13 may be combined with any of aspects 1-12 and includes that a second portion of sidelink control information in a PSSCH includes information assigning resources indicated in the SCI-1 to the one or more UEs.

Aspect 14 may be combined with any of aspects 1-13 and includes that the SCI-2 includes a scheduler ID for the first UE.

Aspect 15 may be combined with any of aspects 1-14 and includes that the SCI-2 includes one or more resource assignment fields including at least one of: a scheduled UE ID corresponding to the resources indicated in the SCI-1, a HARQ process ID, information mapping to the scheduling request, or mapping information between the scheduled UE ID and the resources indicated in the SCI-1.

Aspect 16 may be combined with any of aspects 1-15 and includes that the SCI-2 indicates an additional granted resource based on at least one of: a TDRA for the additional granted resource, an FDRA for the additional granted resource, a period for the additional granted resource, an MCS index for the additional granted resource, an MCS table for the additional granted resource, a DMRS port indication for the additional granted resource, a beta offset indicator for the additional granted resource, a scheduled UE ID for the additional granted resource, a HARQ process ID for the additional granted resource, or information mapping to the scheduling request for the additional granted resource.

Aspect 17 is an apparatus for wireless communication at a second UE including at least one processor coupled to a memory and configured to transmit, to a first UE, a scheduling request for a sidelink resource; receive, from the first UE, a sidelink grant using resources for sidelink grant transmissions; and transmit a sidelink transmission based on the sidelink grant.

Aspect 18 may be combined with aspect 17 and includes that the resources for the sidelink grant transmissions are dedicated for the sidelink grant transmissions.

Aspect 19 may be combined with any of aspects 17-18 and includes that the at least one processor is further configured to receive a configuration of the resources for the sidelink grant transmissions prior to transmitting the sidelink grant.

Aspect 20 may be combined with any of aspects 17-19 and includes that the at least one processor is further configured to receive, from the first UE an indication of a frequency for the resources for the sidelink grant transmissions.

Aspect 21 may be combined with any of aspects 17-20 and includes that the sidelink grant is included in a first portion of sidelink control information in a PSCCH.

Aspect 22 may be combined with any of aspects 17-21 and includes that the sidelink grant indicates at least one of a TDRA or an FDRA that are allocated to the second UE.

Aspect 23 may be combined with any of aspects 17-22 and includes that the sidelink grant is for periodic resources and indicates a reservation period.

Aspect 24 may be combined with any of aspects 17-22 and includes that the sidelink grant is for an aperiodic resource.

Aspect 25 may be combined with any of aspects 17-24 and includes that at least one of an SCI bit or an SCI-2 format indicates that the SCI-1 includes the sidelink grant.

Aspect 26 may be combined with any of aspects 17-25 and includes that at least one bit of SCI differentiates the sidelink grant for the second UE from a sidelink resource reservation for the first UE.

Aspect 27 may be combined with any of aspects 17-26 and includes that the at least one processor is further configured to receive a priority value associated with the sidelink grant.

Aspect 28 may be combined with any of aspects 17-27 and includes that a second portion of the sidelink control information in a PSSCH includes information assigning at least one resource indicated in the SCI-1 to the second UE.

Aspect 29 may be combined with any of aspects 17-28 and includes that the SCI-2 includes a scheduler ID for the first UE and one or more resource assignment fields including at least one of: a scheduled UE ID corresponding to the at least one resource indicated in the SCI-1, a HARQ process ID, information mapping to the scheduling request, or mapping information between the scheduled UE ID and the at least one resource indicated in the SCI-1.

Aspect 30 may be combined with any of aspects 17-29 and includes that the SCI-2 indicates an additional granted resource based on at least one of: a TDRA for the additional granted resource, an FDRA for the additional granted resource, a period for the additional granted resource, an MCS index for the additional granted resource, an MCS table for the additional granted resource, a DMRS port indication for the additional granted resource, a beta offset indicator for the additional granted resource, a scheduled UE ID for the additional granted resource, a HARQ process ID for the additional granted resource, or information mapping to the scheduling request for the additional granted resource.

Aspect 31 may be combined with any of aspects 1-30 and further includes at least one of an antenna or a transceiver coupled to the at least one processor.

Aspect 32 is a method of wireless communication for implementing any of aspects 1-31.

Aspect 33 is an apparatus for wireless communication including means for implementing any of aspects 1-31.

Aspect 34 is a computer-readable medium storing computer executable code, the code when executed by at least one processor causes the at least one processor to implement any of aspects 1-31.

What is claimed is:

1. A first user equipment (UE) for wireless communication, comprising:

one or more memories; and at least one processor coupled to the one or more memories-and configured to cause the first UE to:

transmit, from the first UE to one or more UEs, a configuration of resources reserved for sidelink grant transmissions, wherein the sidelink grant transmissions are associated with a first priority;

receive, from the one or more UEs, a scheduling request for sidelink resources; and transmit, from the first UE to the one or more UEs, a sidelink grant via the resources reserved for the sidelink grant transmissions, wherein the sidelink resources indicated in the sidelink grant are associated with a second priority that is higher than the first priority, wherein the sidelink grant is included in a first portion of sidelink control information (SCI-1) in a physical sidelink control channel (PSCCH), wherein a second portion of the sidelink control information (SCI-2) in a physical sidelink shared channel (PSSCH) includes information assigning resources indicated in the SCI-1 to the one or more UEs, and wherein the SCI-2 includes one or more resource assignment fields including at least one of:

a scheduled UE identifier (ID) corresponding to the resources indicated in the SCI-1, a hybrid automatic repeat request (HARQ) process ID, additional information mapping the sidelink grant to the scheduling request, or mapping information between the scheduled UE ID and the resources indicated in the SCI-1.

2. The first UE of claim 1, wherein the at least one processor is further configured to cause the first UE to indicate a frequency for the resources for the sidelink grant transmissions.

3. The first UE of claim 1, wherein the sidelink grant indicates at least one of a time domain resource allocation (TDRA) or a frequency domain resource allocation (FDRA) for the one or more UEs.

4. The first UE of claim 3, wherein the sidelink grant is for periodic resources and indicates a reservation period.

5. The first UE of claim 3, wherein the sidelink grant is for an aperiodic resource.

6. The first UE of claim 1, wherein at least one of a sidelink control information bit or sidelink control information format indicates that the SCI-1 includes the sidelink grant.

7. The first UE of claim 6, wherein a format of the SCI-2-indicates that the SCI-1 includes the sidelink grant.

8. The first UE of claim 1, wherein at least one sidelink control information bit differentiates the sidelink grant for the one or more UEs from a sidelink resource reservation for the first UE.

9. The first UE of claim 1, wherein the SCI-2 includes a scheduler identifier (ID) for the first UE.

10. The first UE of claim 1, wherein the SCI-2 indicates an additional granted resource based on at least one of:

a time domain resource allocation (TDRA) for the additional granted resource, a frequency domain resource allocation (FDRA) for the additional granted resource, a period for the additional granted resource, a modulation and coding scheme (MCS) index for the additional granted resource, an MCS table for the additional granted resource, a demodulation reference signal (DMRS) port indication for the additional granted resource, a beta offset indicator for the additional granted resource, a scheduled UE identifier (ID) for the additional granted resource, a hybrid automatic repeat request (HARQ) process ID for the additional granted resource, or additional information mapping the sidelink grant to the scheduling request for the additional granted resource.

11. A second user equipment (UE) for wireless communication, comprising:

one or more memories; and at least one processor coupled to the one or more memories and configured to cause the second UE to:

receive, from a first UE, a configuration of resources reserved for sidelink grant transmissions, wherein the sidelink grant transmissions are associated with a first priority;

transmit, to the first UE, a scheduling request for a sidelink resource;

receive, from the first UE, a sidelink grant via the resources reserved for the sidelink grant transmissions, wherein the sidelink resource indicated in the sidelink grant is associated with a second priority that is higher than the first priority, wherein the sidelink grant is included in a first portion of sidelink control information (SCI-1) in a physical sidelink control channel (PSCCH), wherein the sidelink grant indicates at least one of a time domain resource allocation (TDRA) or a frequency domain resource allocation (FDRA) for the second UE, and wherein at least one sidelink control information bit differentiates the sidelink grant for the second UE from a sidelink resource reservation for the first UE; and transmit a sidelink transmission based on the sidelink grant.

12. The second UE of claim 11, wherein the at least one processor is further configured to receive, from the first UE an indication of a frequency for the resources for the sidelink grant transmissions.

13. The second UE of claim 11, wherein the sidelink grant is for periodic resources and indicates a reservation period.

14. The second UE of claim 11, wherein the sidelink grant is for an aperiodic resource.

15. The second UE of claim 11, wherein at least one of a sidelink control information (SCI) bit or an SCI-2 format indicates that the SCI-1 includes the sidelink grant.

16. The second UE of claim 11, wherein a second portion of the sidelink control information (SCI-2) in a physical sidelink shared channel (PSSCH) includes information assigning at least one resource indicated in the SCI-1 to the second UE.

17. The second UE of claim 16, wherein the SCI-2 includes a scheduler identifier (ID) for the first UE and one or more resource assignment fields including at least one of:

a scheduled UE identifier (ID) corresponding to the at least one resource indicated in the SCI-1, a hybrid automatic repeat request (HARQ) process ID, additional information mapping the sidelink grant to the scheduling request, or mapping information between the scheduled UE ID and the at least one resource indicated in the SCI-1.

18. The second UE of claim 16, wherein the SCI-2 indicates an additional granted resource based on at least one of:

a time domain resource allocation (TDRA) for the additional granted resource, a frequency domain resource allocation (FDRA) for the additional granted resource, a period for the additional granted resource, a modulation and coding scheme (MCS) index for the additional granted resource, an MCS table for the additional granted resource, a demodulation reference signal (DMRS) port indication for the additional granted resource, a beta offset indicator for the additional granted resource, a scheduled UE identifier (ID) for the additional granted resource, a hybrid automatic repeat request (HARQ) process ID for the additional granted resource, or additional information mapping the sidelink grant to the scheduling request for the additional granted resource.

19. A method of wireless communication at a first user equipment (UE), comprising one of:

transmitting, from the first UE to one or more UEs, a configuration for resources reserved for sidelink grant transmissions, wherein the sidelink grant transmissions are associated with a first priority, receiving, from the one or more UEs, a scheduling request for sidelink resources, and transmitting, from the first UE to the one or more UEs, a sidelink grant using the resources for the sidelink grant transmissions, wherein the sidelink resources indicated in the sidelink grant are associated with a second priority that is higher than the first priority; or receiving, from a second UE, the configuration of resources reserved for the sidelink grant transmissions, wherein the sidelink grant transmissions are associated with the first priority, transmitting, to the second UE, an additional scheduling request for an additional sidelink resource, receiving, from the second UE, an additional sidelink grant via the resources reserved for the sidelink grant transmissions, wherein the additional sidelink resource indicated in the additional sidelink grant is associated with the second priority that is higher than the first priority, and transmitting a sidelink transmission based on the additional sidelink grant, wherein at least one of the sidelink grant or the additional sidelink grant is included in a first portion of sidelink control information (SCI-1) in a physical sidelink control channel (PSCCH) and wherein a second portion of the sidelink control information (SCI-2) in a physical sidelink shared channel (PSSCH) includes information assigning resources indicated in the SCI-1 to one of the one or more UEs or the first UE, and wherein the SCI-2 indicates an additional granted resource based on at least one of:

a time domain resource allocation (TDRA) for the additional granted resource, a frequency domain resource allocation (FDRA) for the additional granted resource, a period for the additional granted resource, a modulation and coding scheme (MCS) index for the additional granted resource, an MCS table for the additional granted resource, a demodulation reference signal (DMRS) port indication for the additional granted resource, a beta offset indicator for the additional granted resource, a scheduled UE identifier (ID) for the additional granted resource, a hybrid automatic repeat request (HARQ) process ID for the additional granted resource, or additional information mapping one of the sidelink grant to the scheduling request for the additional granted resource or the additional sidelink grant to the additional scheduling request for the additional granted resource.

20. The method of claim 19, wherein the SCI-2 includes one or more resource assignment fields including at least one of:

a scheduled UE identifier (ID) corresponding to the resources indicated in the SCI-1, a hybrid automatic repeat request (HARQ) process ID, additional information mapping one of the sidelink grant to the scheduling request or the additional sidelink grant to the additional scheduling request, or mapping information between the scheduled UE ID and the resources indicated in the SCI-1.

\* \* \* \* \*